United States Patent
Perisetty

(10) Patent No.: US 7,639,067 B1
(45) Date of Patent: *Dec. 29, 2009

(54) INTEGRATED CIRCUIT VOLTAGE REGULATOR

(75) Inventor: Srinivas Perisetty, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 11/636,907

(22) Filed: Dec. 11, 2006

(51) Int. Cl.
*G05F 1/10* (2006.01)

(52) U.S. Cl. .......................... 327/537; 327/534; 326/41

(58) Field of Classification Search ......... 323/282–290, 323/237, 241, 268; 363/65, 71, 72, 77, 81; 327/142, 143, 155–160, 538, 534–537, 540–546; 326/38, 41

See application file for complete search history.

(56) References Cited

U.S. PATENT DOCUMENTS

| | | | |
|---|---|---|---|
| 5,336,986 A | 8/1994 | Allman | |
| 5,459,684 A * | 10/1995 | Nakamura et al. | 365/149 |
| 5,576,990 A | 11/1996 | Camerlenghi et al. | |
| 5,815,445 A | 9/1998 | Hull et al. | |
| 5,844,404 A | 12/1998 | Caser et al. | |
| 6,114,843 A | 9/2000 | Olah | |
| 6,366,224 B2 | 4/2002 | Cliff et al. | |
| 6,801,028 B2 * | 10/2004 | Kernahan et al. | 323/283 |
| 7,072,198 B2 * | 7/2006 | Krug et al. | 363/127 |
| 7,142,009 B1 | 11/2006 | Watt et al. | |
| 7,199,565 B1 * | 4/2007 | Demolli | 323/273 |

OTHER PUBLICATIONS

Srinivas Perisetty, U.S. Appl. No. 11/369,664, filed Mar. 6, 2006.

* cited by examiner

*Primary Examiner*—Rajnikant B Patel
(74) *Attorney, Agent, or Firm*—Treyz Law Group; G. Victor Treyz; Nancy Y. Ru

(57) ABSTRACT

Voltage regulator circuitry is provided that exhibits a high power supply rejection ratio and a wide output voltage range. The voltage regulator circuitry can regulate power supply voltages for circuitry on a programmable logic device such as transistor body bias circuitry and configuration random-access-memory array circuitry. The voltage regulator circuitry includes an n-channel metal-oxide-semiconductor drive transistor that is coupled between a power supply voltage terminal and an output terminal. The n-channel metal-oxide-semiconductor drive transistor has a gate that receives a control signal from an operational amplifier. A boost circuit generates an elevated power supply voltage for the operational amplifier. A programmable voltage divider is coupled to the voltage regulator's output. The operational amplifier produces the control signal by comparing a feedback signal from the voltage divider to a reference voltage.

20 Claims, 9 Drawing Sheets

INTEGRATED CIRCUIT VOLTAGE REGULATOR

BACKGROUND

This invention relates to integrated circuit voltage regulators, and more particularly, to integrated circuit voltage regulators that operate over a wide voltage range and exhibit large power supply rejection ratios in integrated circuits such as programmable logic device integrated circuits.

Integrated circuits contain circuitry that is powered at a variety of power supply levels. In a typical scenario, an integrated circuit may contain core logic that is powered using a relatively low power supply voltage and peripheral input-output circuitry that operates at a relatively high power supply voltage. Additional circuit functions may require other power supply voltages.

One way to satisfy the need for multiple power supply voltages on an integrated circuit is to require system designers to supply suitable power supply voltages externally. This approach requires system designers to design circuit boards in which a number of power supply voltages are routed to the power supply pins of the integrated circuit.

It is generally desirable to minimize the number of power supply pins that are used in a given design. The quantity of pins available to supply an integrated circuit with power supply voltages is limited due to considerations such as circuit real estate consumption and device complexity. Although it would be convenient to be able to add a new power supply pin for each new power supply voltage that is needed on an integrated circuit, this is generally not feasible in practice.

One way to overcome the limited number of power supply voltages that are supplied externally to an integrated circuit involves generating power supply voltages using on-chip voltage regulator circuitry. By using an on-chip voltage regulator, it is possible to generate a new power supply voltage that would otherwise not be available.

Voltage regulator circuitry may also be used on an integrated circuit to regulate externally supplied power supply voltages. This helps to ensure that the circuitry on the integrated circuit will be powered at the appropriate voltage level, even if the voltage of the external supply deviates somewhat from its nominal level.

An important figure of merit for a voltage regulator is its ability to reject power supply noise. Voltage regulators characterized by large power supply rejection ratios (PSRRs) are able to effectively filter out noise on their power supply terminals. Voltage regulators with low power supply rejection ratios tend to be susceptible to noise.

In many applications, it is important that the output of the voltage regulator be close to its power supply voltage. In a voltage regulator design with a poor output range, there is a relatively large voltage drop between the voltage regulator's power supply voltage and the voltage regulator's output. In this type of situation, it may be difficult or impossible to use the voltage regulator's output for its intended purpose. Raising the voltage regulator's power supply voltage can help address this problem, but this option is often not available because there are only a limited number of externally-supplied power supply voltages and power supply voltage pins on the integrated circuit that contains the voltage regulator. Moreover, techniques that are conventionally used to help raise the power supply rejection ratio of a voltage regulator often adversely affect the voltage regulator's output range.

It would therefore be desirable to be able to provide a voltage regulator for an integrated circuit such as a programmable logic device that exhibits a large power supply rejection ratio and a wide output voltage range.

SUMMARY

In accordance with the present invention, voltage regulator circuitry is provided that exhibits a large power supply rejection ratio and a wide output voltage range. The voltage regulator circuitry may be used in integrated circuits such as programmable logic device integrated circuits. With one suitable arrangement, the voltage regulator circuitry is used to produce a regulated output voltage for circuitry such as transistor body biasing circuitry and configuration random-access-memory circuitry.

The voltage regulator circuitry includes an n-channel metal-oxide-semiconductor transistor having a drain connected to a power supply terminal and a source connected to an output terminal. A regulated output voltage is provided at the output terminal. The n-channel metal-oxide-semiconductor transistor has a gate that receives a control signal from an operational amplifier.

A voltage divider is connected between the output terminal and a ground terminal. A feedback signal from a voltage tap point within the voltage divider is provided to one input of the operational amplifier. A bandgap reference circuit provides a reference voltage to another input of the operational amplifier. The operational amplifier produces the control signal on its output terminal based on a comparison of its inputs.

The voltage regulator circuitry includes a boost circuit that increases the power supply voltage received at the power supply terminal to produce an elevated power supply voltage. The elevated power supply voltage is used to power the operational amplifier. This ensures that the voltage regulator is able to produce voltages over a wide output range.

The voltage divider may be adjustable. With one suitable arrangement, the voltage divider includes programmable elements that can be loaded with configuration data to adjust a chain of series-connected resistors.

The boost circuit may contain a comparator that generates a control signal based on a reference voltage and a feedback signal. The boost circuit may contain a current-controlled oscillator that receives the control signal from the comparator. The oscillator generates a multiphase clock signal. Level shifter circuitry boosts the level of the clock signal and generates true and complement versions of the boosted clock. Charge pump circuitry is driven by the boosted clock signals. The output of the charge pump circuitry is used to produce the elevated power supply voltage. The feedback signal for the comparator may be obtained by tapping the output of the charge pump. A monitor circuit may be included in the boost circuit to compensate for variations in process, temperature, and voltage. The monitor circuit may include a diode-connected transistor that is geometry matched to the n-channel metal-oxide-semiconductor transistor.

Further features of the invention, its nature and various advantages will be more apparent from the accompanying drawings and the following detailed description of the preferred embodiments.

DETAILED DESCRIPTION

The present invention relates to voltage regulators. The voltage regulators of the present invention may be used to regulate power supply voltages or any other suitable voltages. The use of the voltage regulators to produce a regulated power supply voltage is described herein as an example.

The voltage regulators may be formed on integrated circuits. The integrated circuits in which the voltage regulators may be formed may be any suitable integrated circuits in which it is desired to regulate a power supply voltage or other voltage. For example, the integrated circuits may be memory chips, digital signal processing circuits, microprocessors, application specific integrated circuits, or any other suitable integrated circuit. With one suitable arrangement, which is described herein as an example, a voltage regulator in accordance with the invention is used to regulate a power supply voltage on a programmable logic device.

Figure 1:
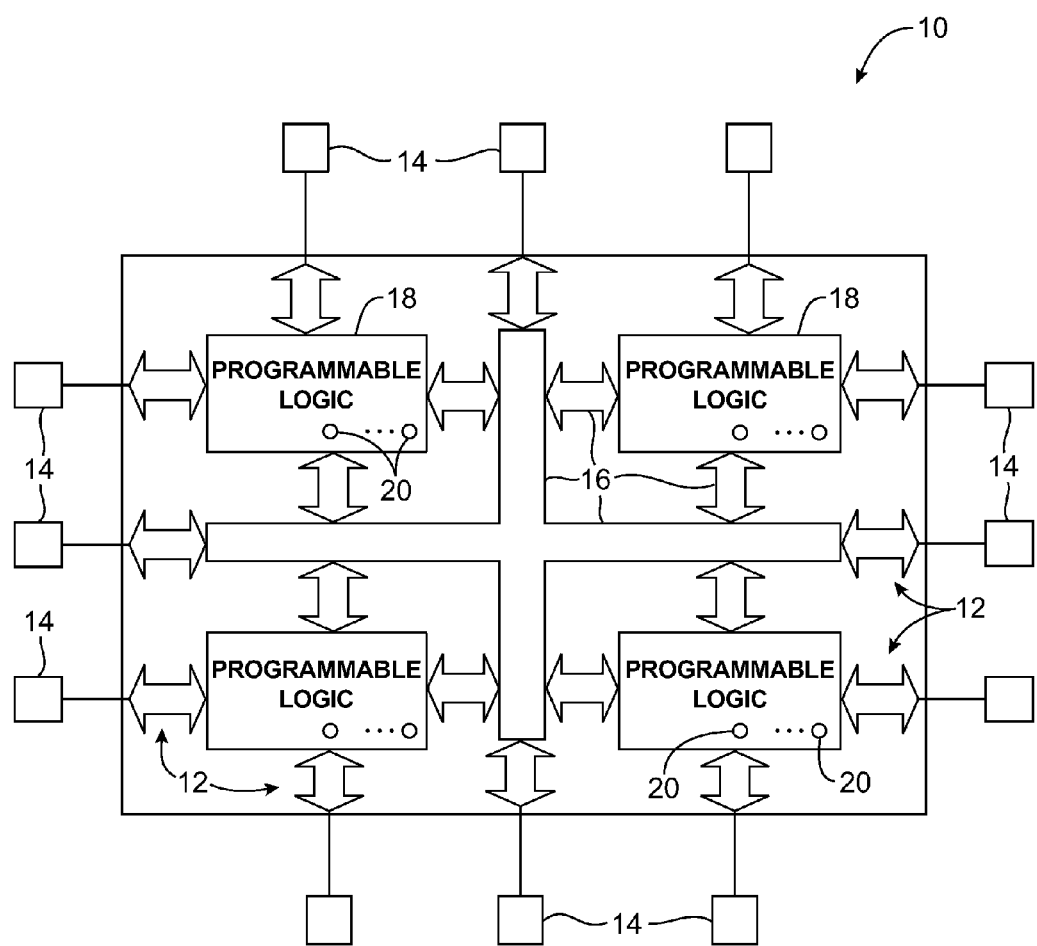
FIG. 1 is a diagram of an illustrative programmable logic device integrated circuit in accordance with the present invention.

An illustrative programmable logic device 10 in accordance with the present invention is shown in FIG. 1. Programmable logic device 10 may have input/output circuitry 12 for driving signals off of device 10 and for receiving signals from other devices via input/output pins 14.

Interconnects 16 such as global and local vertical and horizontal conductive lines may be used to route signals on device 10.

Programmable logic 18 may include combinational and sequential logic circuitry. The programmable logic 18 may be configured to perform a custom logic function.

Programmable logic device 10 contains programmable elements 20. Elements 20 can be programmed using configuration data. In general, elements 20 may be based on any suitable technology. With one suitable arrangement, elements 20 are formed form volatile memory such as random-access memory. With another suitable arrangement, elements 20 are formed from non-volatile structures such as programmable fuses, programmable antifuses, or programmable-read-only memory. In mask-programmed arrangements, groups of programmable via structures that are programmed using custom lithographic masks are used to form elements 20.

Most commonly, programmable elements 20 are formed from memory elements that can be loaded with configuration data (also called programming data) using pins 14 and input/output circuitry 12. The programmable elements 20 may, as an example, be provided in the form of an array of random-access-memory elements (RAM) that are loaded with configuration data. Because the RAM array is located with configuration data, RAM arrays such as these are sometimes referred to as configuration random-access memory (CRAM) arrays.

Once loaded with configuration data, the programmable elements 20 each provide a corresponding static control output signal that controls the state of an associated logic component in programmable logic 18. The memory element output signals are typically applied to the gates of metal-oxide-semiconductor (MOS) transistors. These transistors may include n-channel metal-oxide-semiconductor (NMOS) pass transistors in programmable components such as multiplexers. Some of the output signals may also be used to control p-channel metal-oxide-semiconductor (PMOS) transistors (e.g., power-down transistors). By loading appropriate configuration data into the programmable elements 20, a logic designer can configure programmable logic device 10 to perform a desired custom logic function.

The circuitry of device 10 may be organized using any suitable architecture. As an example, the logic of programmable logic device 10 may be organized in a series of rows and columns of larger programmable logic regions each of which contains multiple smaller logic regions. The larger logic regions are sometimes referred to as logic array blocks. The smaller logic regions are sometimes referred to as logic elements. A typical logic element may contain a look-up table, registers, and programmable multiplexers. If desired, the logic of device 10 may be arranged in more levels or layers in which multiple large regions are interconnected to form still larger portions of logic. Still other device arrangements may use logic that is not arranged in rows and columns.

The logic resources of device 10 may be interconnected by interconnects 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. Interconnects 16 may include fixed interconnects (conductive lines) and programmable interconnects (i.e., interconnects for which programmable connections can be made using programmable switches).

Figure 2:
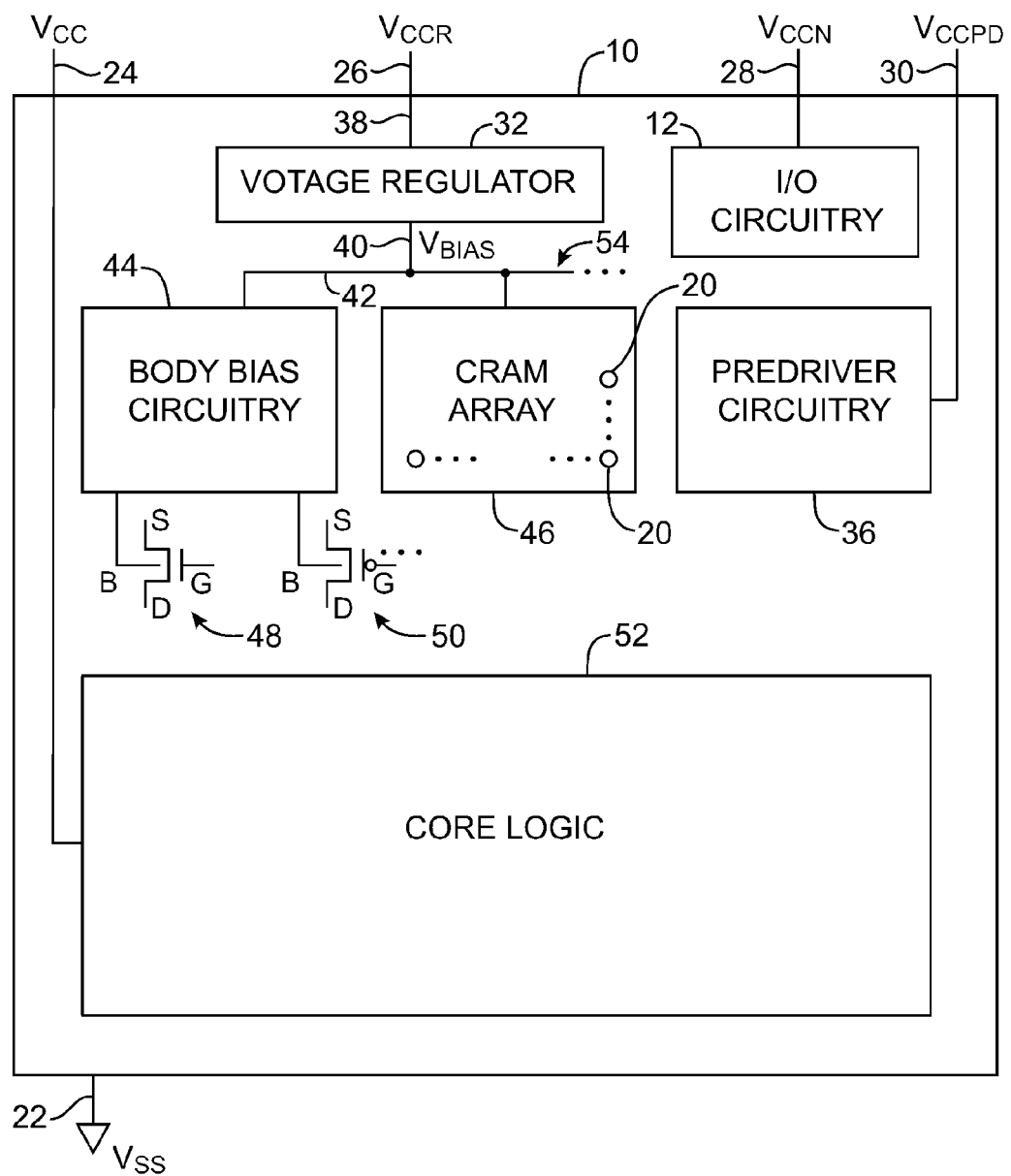
FIG. 2 is a diagram of an illustrative programmable logic device containing a voltage regulator in accordance with the present invention.

As shown in FIG. 2, programmable logic device integrated circuit 10 may include circuitry that operates at a number of different power supply voltage levels. In the example of FIG. 2, programmable logic device 10 is provided with a ground power supply voltage Vss (e.g., 0 volts) at pin 22. Device 10 is also provided with positive power supply voltages Vcc, Vccr, Vccn, and Vccpd at respective positive power supply terminals 24, 26, 28, and 30. This arrangement is merely illustrative. Integrated circuits such as integrated circuit 10 of FIG. 2 may be provided with any suitable power supply voltages.

In the example of FIG. 2, programmable logic device integrated circuit 10 contains core logic 52. Core logic 52 may be powered using a relatively low power supply voltage Vcc. Using a low power supply voltage in the core logic helps to reduce power consumption. Core logic 52 is generally located in the center of an integrated circuit.

Peripheral circuitry such as input-output circuitry 12 may be powered using a relative larger power supply voltage Vccn. Use of the larger power supply voltage Vccn ensures that input and output drivers in input-output circuitry 12 are able to communicate properly with external circuitry. As an example, the power supply voltage Vccn allows output drivers to transmit outgoing data signals at voltage levels that are compliant with commonly used communications standards. These standards may require the use of relatively large signal voltages to increase noise immunity on circuit board busses. If only lower voltages such as Vcc were available to power the input-output drivers, it might be difficult or impossible to interface with other integrated circuits.

If desired, programmable logic device integrated circuit 10 may be powered using an intermediate power supply voltage Vccpd. The value of Vccpd generally lies between the low voltage associated with Vcc and the higher voltage associated with Vccn. Power supply voltage Vccpd may be used to power predriver circuitry 36. Predriver circuitry 36 may contain output drivers that drive output signals from core logic 52 into output buffer circuitry in input-output circuitry 12. Predriving output signals into input-output circuitry 34 helps to improve device performance while reducing overall power consumption.

With one suitable arrangement, the core logic power supply voltage Vcc is about 1.1-1.2 volts, the input-output power supply voltage Vccn is set by a system designer to a level between about 1.5 volts and 3.0 volts, and the predriver power supply voltage level is set to about 2.5 to 3.0 volts (the system designer may be required to set Vccpd to 3.0 volts when Vccn is 3.0 volts). These are merely power supply voltage levels that may be used. As technology improves with time, it is expected that lower power supply voltages may be used. In general, any suitable voltage levels may be used if desired.

Programmable logic device integrated circuit 10 may include circuitry that uses other power supply voltages. In the example of FIG. 2, programmable logic device integrated circuit 10 is supplied with an external power supply voltage Vccr at terminal 26. Path 38 is used to convey power supply voltage Vccr to the input of voltage regulator 32. Voltage regulator 32 produces a corresponding regulated power supply voltage Vbias at its output 40.

Programmable logic device integrated circuit 10 of FIG. 2 includes circuitry such as body bias circuitry 44 and configuration random-access-memory (CRAM) array 46 that is powered using the regulated power supply voltage Vbias. The voltage Vbias is typically elevated with respect to Vcc. The voltage Vbias may, as an example, be a voltage of about 2.0-2.5 volts. Voltage Vbias may be supplied to body bias circuitry 44 and CRAM array 46 using voltage regulator 32 output line 40 and distribution path 42. As indicated by path extension 54, the distribution path 42 may extend to other regions of circuitry on programmable logic device 10. The use of the voltage Vbias as a power supply input voltage to body bias circuitry 44 and CRAM array circuitry 46 is merely illustrative. Voltage regulator 32 may regulate any suitable input voltage to produce any suitable regulated output voltage on programmable logic device integrated circuit 10.

Circuitry such as body bias circuitry 44 may be used to apply a body bias signal to the body (B) terminals of n-channel metal-oxide-semiconductor transistors such as transistor 48 and p-channel metal-oxide-semiconductor transistor such as transistor 50. Transistors such as transistors 48 and 50 may, if desired, be part of core logic 52. Body biasing arrangements may be used to improve transistor performance or may be used to reduce transistor leakage currents and thereby reduce power consumption on the integrated circuit 10.

CRAM array 46 may contain an array of programmable random-access-memory elements 20. Circuitry in CRAM array may be used to apply elevated power supply voltages to the elements 20 during certain operations (e.g., during normal operation following write operations at lowered voltages). The elevated power supply voltages may be equal to Vbias or may be derived from Vbias. When an elevated power supply voltage is used in CRAM memory elements 20, the static output signals that are generated by the CRAM memory elements 20 based on their loaded configuration data may drive associated components (e.g., n-channel metal-oxide-semiconductor transistors) in core logic 52 more strongly than would otherwise be possible. The use of an elevated power supply voltage such as Vbias in CRAM array 46 may therefore enhance the performance of programmable logic device integrated circuit 10.

To obtain the benefits of using body bias circuitry 44 and CRAM arrays with elevated power supplies such as CRAM array 46, voltage regulator 32 should produce a voltage Vbias that has a low noise level. If desired, noise can be lowered on the Vbias signal by avoiding the use of potentially noisy power supply voltages such as Vccn and Vccpd to power regulator 32. These supplies tend to be susceptible to noise due to the presence of signal switching as drivers in the input-output circuitry 34 and predriver circuitry 36 switch during normal operation. In the example of FIG. 2, the voltage Vccr is not connected to the input-output circuitry 34 or the predriver circuitry 36 or any other noisy switching circuitry, so the voltage Vccr is characterized by low noise levels. The voltage Vccr may be, for example, 2.5 volts. If a low-noise external supply such as Vccr is not available on a given device 10, other supply levels may be used to power voltage regulator 32 (e.g., Vccpd).

The design of voltage regulator 32 further reduces noise while providing a wide output range. The low-noise properties of voltage regulator 32 allow the regulated output voltage Vbias to be used in sensitive circuits such as body bias circuitry 44 and the elevated power supply circuitry of CRAM array 46. The wide output range associated with voltage regulator 32 allows the voltage Vbias to be close to the voltage Vccr. If, for example, the voltage of Vccr is 2.5 volts, the voltage Vbias may be about 2.0-2.5 volts (as an example). This relatively large signal level is helpful in supporting satisfactory operation of circuitry 44 and 46.

Figure 3:
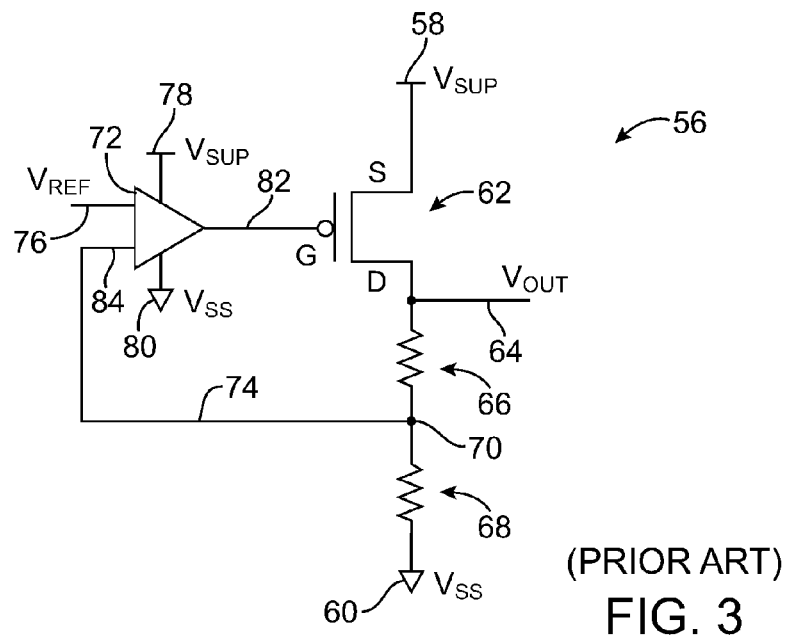
FIG. 3 is a diagram of a conventional voltage regulator based on a p-channel metal-oxide-semiconductor transistor configuration.

Conventional voltage regulators have used both p-channel metal-oxide-semiconductor (PMOS) transistor designs and n-channel metal-oxide-semiconductor (NMOS) transistor designs to regulate power supply voltages. A conventional power supply voltage regulator 56 that uses a PMOS design is shown in FIG. 3. Conventional voltage regulator 56 of FIG. 3 has a PMOS drive transistor 62. Regulator 56 is powered using a positive power supply voltage Vsup at terminal 58 and a ground power supply voltage Vss at terminal 60. The regulated output voltage of voltage regulator 56 is the signal Vout that is provided on output line 64.

A voltage divider formed by resistors 66 and 68 is used to sample the voltage Vout. The relative sizes of resistors 66 and 68 are used to set the desired output voltage level for Vout. The voltage on node 70 from the voltage divider is fed back to input 84 of operational amplifier 72 via feedback path 74. Operational amplifier 72 compares the feedback signal on input 84 to a reference voltage on input 76 and generates a corresponding control signal on output line 82. The control signal on line 82 is applied to the gate of PMOS transistor 62. When the voltage on output line 64 becomes too low, operational amplifier 72 detects the resulting low feedback voltage on input 84 and reduces the magnitude of the control signal on line 82. This increases the current flowing from source S to drain D of transistor 62 and raises the voltage Vout closer to its desired value. (The sources and drains of metal-oxide-semiconductor transistors are sometimes referred to collectively as source-drains.) When the voltage on output line 64 becomes too high, operational amplifier 72 raises the control signal voltage on line 82. This decrease the current flowing from source S to drain D and lowers the voltage Vout towards its desired value.

Because voltage regulator 56 uses a PMOS drive transistor 62, regulator 56 is able to produce regulated output voltages Vout that are close to the supply voltage Vsup. Operational amplifier 72 is powered using power supply voltage Vsup at positive power supply terminal 78 and ground voltage Vss at ground power supply terminal 80. Due to the behavior of the internal circuitry of operational amplifier 72, the control signal produced on output 82 lies in a range of about 0.2 volts above the lower power rail Vss and about 0.2 volts below the upper power rail Vsup. At output voltages near the lower portion of this range, transistor 62 is fully on and the voltage Vout approaches Vsup.

Figure 4:
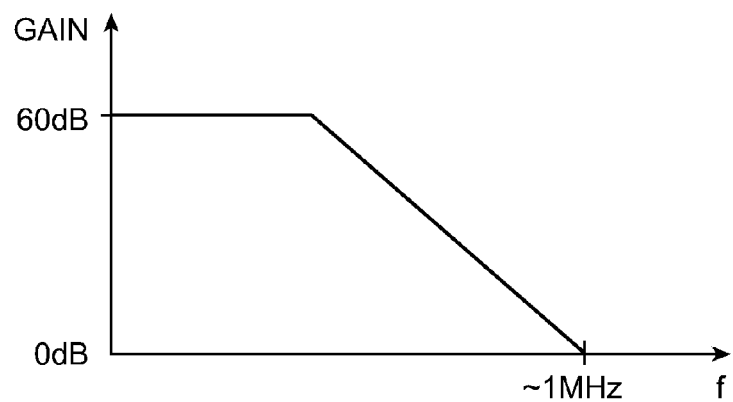
FIG. 4 is a graph of an illustrative gain versus frequency characteristic for a conventional operational amplifier in a voltage regulator of the type shown in FIG. 3.

Although regulators such as regulator 56 are able to produce a wide range of output voltages Vout, they tend to exhibit low power supply rejection ratios. The relatively poor power supply rejection ratio performance of conventional PMOS voltage regulator 62 of FIG. 3 arises from the fixed bandwidth of operational amplifier 72. Operational amplifiers such as operational amplifier 72 are typically designed with high gain to minimize the effects of current and voltage offsets due to process variations. A typical operational amplifier 72 may exhibit a gain versus frequency characteristic of the type shown in FIG. 4. At high frequencies, the gain of the amplifier deteriorates, until collapsing completely at about 1 MHz. At frequencies above 1 MHz (in this example), the output of the operational amplifier is unable to respond to changes in the input of the operational amplifier. The control signal on line 82 of FIG. 3 therefore becomes fixed.

With a fixed control signal on the gate of PMOS transistor 62, the gate-to-source voltage Vgs of transistor 62 is dictated by the noise level on Vsup. If there is noise on Vsup (i.e., noise at frequencies above 1 MHz), this noise becomes noise on the source-to-gate voltage Vgs. The source-drain current through transistor 62 is proportional to Vgs-Vt, where Vt is the threshold voltage of transistor 62. As a result, noise on Vgs is converted into noise on Vout.

Figure 5:
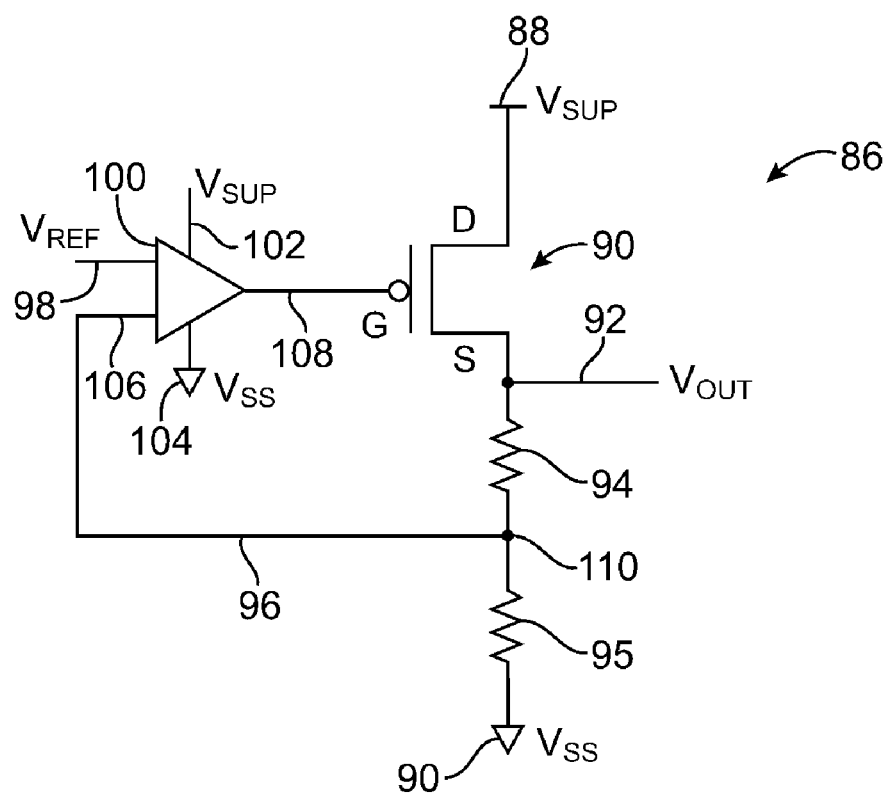
FIG. 5 is a diagram of a conventional voltage regulator based on an n-channel metal-oxide-semiconductor transistor configuration.

Because of the relatively poor noise properties of PMOS-based regulator designs of the type shown in FIG. 3, circuit designers sometimes turn to NMOS-based designs. A conventional NMOS-based voltage regulator 86 is shown in FIG. 5. Conventional voltage regulator 86 of FIG. 5 has an NMOS drive transistor 90. A positive power supply voltage Vsup is applied to positive power supply terminal 88 and a ground power supply voltage Vss is applied to ground terminal 90. The regulated output voltage Vout of voltage regulator 86 is provided on output line 92.

Resistors 94 and 95 form a voltage divider that is used to sample the voltage Vout on line 92 and that sets the operating point for regulator 86. The voltage on node 110 from the voltage divider is fed back to input 106 of operational amplifier 100 via feedback path 96. Operational amplifier 100 compares the feedback signal on input 106 to the reference voltage on input 98 and generates a corresponding control signal on output line 108. The control signal on line 108 is applied to the gate of NMOS transistor 90.

When the voltage on output line 92 falls below the desired level, operational amplifier 100 detects the resulting low feedback voltage on input 106 and increases the magnitude of the control signal on line 108. This increases the current flowing from drain D to source S of transistor 90 and raises the voltage Vout closer to its desired value. When the voltage on output line 92 becomes too high, operational amplifier 100 lowers the control signal voltage on line 108. This decrease the current flowing from drain D to source S and lowers the voltage Vout towards its desired value.

Voltage regulator 86 uses an NMOS drive transistor 90, rather than the PMOS drive transistor 62 used in voltage regulator 56 of FIG. 3. The power supply rejection ratio of NMOS-based voltage regulator 86 is superior to that of PMOS-based voltage regulator 62, because in NMOS arrangements the gate-source voltage Vgs is located between gate control line 108 and output line 92 (as shown in FIG. 5), rather than between gate control line 82 and voltage supply terminal 58 (as shown in FIG. 3). At frequencies above the maximum operating frequency for the operational amplifier 100 (e.g., above 1 MHz in the present example), the operational amplifier does not respond to changes on output line 92 and the control voltage on line 108 is effectively static. Nevertheless, the gate-to-source voltage Vgs (as measured between line 108 and line 92) is not affected by noise on Vsup, because Vsup is connected to the drain of transistor 90 rather than its source. Because the value of Vgs is unaffected by noise on Vsup, the current flowing from drain D to source S in transistor 90 is relatively constant, and the output Vout is constant.

Because the output voltage Vout of NMOS voltage regulators is relatively unaffected by power supply noise on the Vsup terminal, NMOS voltage regulators tend to exhibit larger power supply rejection ratios than PMOS voltage regulators. However, NMOS-based voltage regulators exhibit poor output voltage ranges.

Operational amplifier 100 of voltage regulator 86 is powered by positive power supply voltage Vsup at terminal 102 and by ground power supply voltage Vss at ground power supply voltage terminal 104. Due to the behavior of the internal circuitry of operational amplifier 100, the control signal produced on output 108 lies in a range of about 0.2 volts above the lower power rail Vss and about 0.2 volts below the upper power rail Vsup. The maximum voltage on line 108 is therefore about 0.2 volts below Vsup. Transistor 90 has a threshold voltage Vt of about 0.7 volts. There is therefore a voltage drop between line 108 and line 92 that is approximately equal to Vt. Because the maximum voltage on line 108 is about 0.2 volts below Vsup, the maximum voltage on line Vout is about 0.9 volts (0.2 volts plus Vt) below Vsup.

Use of an NMOS drive transistors 90 therefore helps to increase the power supply rejection ratio of the voltage regulator 86, but results in a poor output voltage range, because the maximum value of regulated output voltage Vout on line 92 is approximately 0.9 volts less than Vsup. In many applications, this type of low maximum output voltage is unacceptable. For example, in a design in which the power supply voltage Vsup is 2.5 volts, the regulated output voltage Vout will be no more than 1.6 volts, which can severely limit the usefulness of the regulated power supply voltage Vout.

Figure 6:
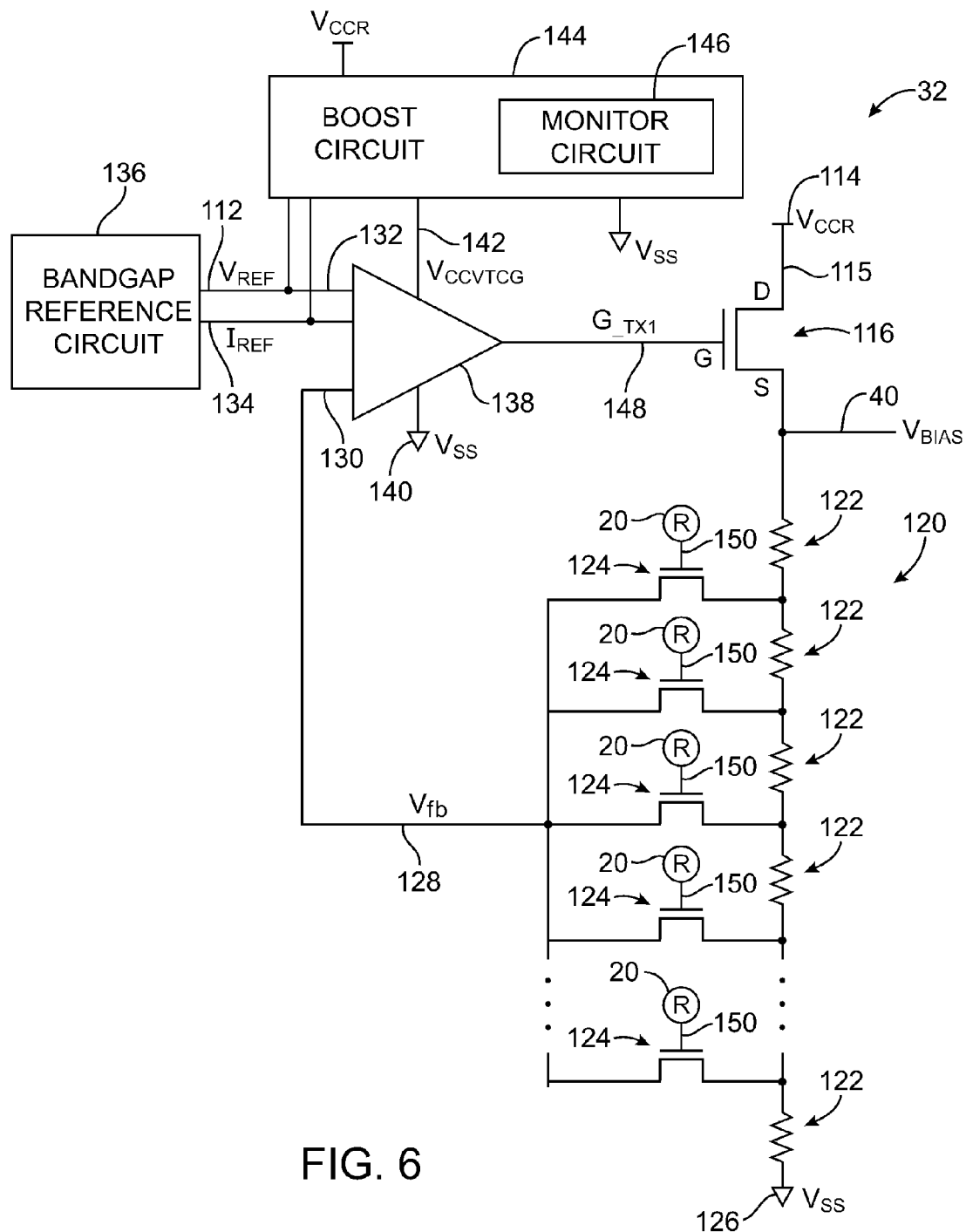
FIG. 6 is a diagram of an illustrative voltage regulator in accordance with the present invention.

In accordance with the present invention, voltage regulator circuitry is provided that exhibits both a high power supply rejection ratio and a wide output range. A voltage regulator 32 in accordance with the present invention is shown in FIG. 6. In the example of FIG. 6, the regulated output voltage of voltage regulator 32 can be adjusted by changing the settings of configuration data stored in programmable memory elements 20. This is merely illustrative. In general, voltage regulator 32 may be provided in an programmable configuration so that its output voltage may be adjusted or may provided in a static configuration that produces a predefined fixed output voltage.

As shown in FIG. 6, voltage regulator 32 is powered with positive power supply voltage Vccr at terminal 114. Positive power supply voltage Vccr may, if desired, be provided to the programmable logic device integrated circuit 10 or other integrated circuit in which voltage regulator 32 is operating uses a pin such as pin 26 of FIG. 2. The positive power supply voltage Vccr may be provided to n-channel metal-oxide-semiconductor transistor 116 via path 115.

Transistor 116 is controlled by a control signal G_tx1 provided to its gate G via control line 148. A regulated output voltage Vbias is provided on output line 40.

In the example of FIG. 6, voltage regulator 32 has an adjustable voltage divider 120. During normal operation, voltage regulator circuit 32 regulates the voltage Vccr that is applied to terminal 114 to produce a desired regulated output voltage Vbias on line 40. The setting of adjustable voltage divider 120 determines the magnitude of the feedback signal Vfb that is applied to the input 130 of operational amplifier 138 on feedback line 128 and thus the desired value for Vbias. Operational amplifier 138 produces the control signal output G_tx1 that controls the gate of drive transistor 116 and thereby regulates the voltage level for the Vbias signal on line 40.

Bandgap reference circuit 136 is powered by a positive power supply voltage such as positive power supply voltage Vccr and a ground power supply voltage such as ground voltage Vss. The bandgap reference circuit 136 supplies reference voltage Vref and reference current Iref on corresponding output lines 112 and 134. The particular values chosen for Vref and Iref are not critical. An example of a suitable Vref value is 0.5 volts. An example of a suitable Iref value is 10 μA.

During normal operation, the feedback voltage Vfb is fed back to operational amplifier 138 from the voltage divider 120 via feedback path 128 and input 130. The voltage Vfb is proportional to the setting of adjustable voltage divider 120 and the magnitude of Vbias. The reference voltage Vref is supplied to operational amplifier 138 via path 112 and input 132.

Operational amplifier 138 compares the signals on inputs 132 and 130 and generates a corresponding output control signal G_tx1 on path 148. When the signal Vfb on line 128 is greater than the signal on line 112, the output of operational amplifier 138 goes low. This tends to turn transistor 116 off and causes the voltage Vbias on line 40 to drop towards the set point value established by the setting of voltage divider 120. When the signal on line 128 is less than the signal on line 112, the output of operational amplifier 138 on line 148 is raised. This tends to turn on n-channel metal-oxide-semiconductor transistor 116, which causes voltage Vbias on line 40 to rise towards Vccr. Using this feedback arrangement, the value of Vbias is held constant at its desired set point value (i.e., a desired voltage between Vss and Vccr determined by the setting of voltage divider 120).

Adjustable voltage divider 120 is formed from a number of series-connected resistors 122. Typical resistor values are about 10 kΩ to 50 kΩ. One end of the resistor chain in voltage divider 120 is maintained at a voltage Vss at terminal 126. The other end of the resistor chain connected to Vbias output 40.

The voltage Vfb is tapped off of the resistor chain in the voltage divider 120 using feedback path 128. By adjusting the point at which the voltage Vfb is tapped from the series-connected resistors in voltage divider 120, the voltage setpoint for the voltage divider can be adjusted. In the illustrative arrangement of FIG. 6, the voltage tap point location in the series-connected resistors of the voltage divider is established by setting the states of programmable elements 20. Each programmable element 20 controls a corresponding transistor 124. The state of each programmable element is determined by its contents. During device programming, configuration data is loaded into programmable elements 20. Programmable elements that are loaded with logic zeros produce low output signals and turn off their associated transistors 124. One of the programmable elements is loaded with a logic one. The logic one in the programmable element causes the output of that programmable element to go high. The high output signal turns on a corresponding transistor 124. The location at which the transistor 124 is turned on in the chain of resistors 122 determines the set point for the voltage divider 120.

The voltage Vfb from the voltage divider 120 is fed back to the operational amplifier 138 via feedback path 128. Operational amplifier 138 is powered using a positive power supply voltage Vccvtcg that is elevated with respect to positive power supply voltage Vccr. The elevated power supply voltage Vccvtcg may be produced by a boost circuit 144. Boost circuit 144 may include a monitor circuit 146 to reduce undesired performance fluctuations in voltage regulator circuit 32 due to due to variations in process, voltage, and temperature (so-called "PVT" variations).

As shown in FIG. 6, boost circuit 144 may be powered using positive power supply voltage Vccr and ground voltage Vss. Boost circuit 144 may contain charge pump circuitry that allows boost circuit 144 to produce a positive power supply output voltage Vccvtcg that is larger than its input power supply voltage Vccr. The elevated power supply voltage Vccvtcg is applied to operational amplifier 138 via path 142. Operational amplifier receives ground power supply voltage Vss from terminal 140.

Because the voltage Vccvtcg is larger than Vccr, the output signal G_tx1 that operational amplifier 138 produces on control line 148 can be relatively large. With one suitable arrangement, Vccvtcg may be large enough to allow the control signal G_tx1 to exceed Vccr by an amount that is about equal to the threshold voltage Vt of transistor 116. Transistor 116 can therefore be fully turned on during voltage regulator operations, which allows output voltage Vbias to range up to about Vccr (i.e., Vbias can be within less than Vt of Vccr and even equal to Vccr). In contrast, with the conventional NMOS-based voltage regulator of FIG. 5, the output voltage range was limited to a maximum voltage of about Vccr-Vt. The use of the n-channel metal-oxide-semiconductor transistor 116 of FIG. 6 ensures that voltage regulator circuit 32 exhibits a large power supply rejection ratio as well as a wide output range.

During normal operation, operational amplifier 138 compares the voltage Vfb that is tapped from the voltage divider 132 to the reference voltage Vref and produces the corresponding output control signal G_tx1. The signal G_tx1 is applied to the gate G of transistor 116. Transistor 116 is normally on and operates in saturation. Current flows from Vccr node 114 to Vss node 126 through the resistors of the voltage divider 120 and the source and drain of transistor 116.

The number of resistors 122 that are used in voltage divider 120 is determined by the number of voltage steps desired for the adjustable voltage regulator 32. If many resistors 122 are used, there will be a relatively large number of voltage steps and voltage regulator 32 will be able to produce desired Vbias levels with a high level of precision. If fewer resistors 122 are used, each voltage step will be larger and less precision will be available, but circuit complexity will be reduced. In general, any suitable number of resistors 122 and associated tap transistors 124 may be used in voltage divider 120.

In the example of FIG. 6, the control signals that are applied to the gates of transistors 124 over control signal lines 150 in adjustable voltage divider 120 are supplied by programmable elements 20 that have been loaded with configuration data. If desired, the control signals for transistors 124 may be dynamic control signals that are supplied from the outputs of programmable logic 18 or hardwired logic on device 10. External control signals may also be used to control transistors 124.

If desired, a decoder may be used to supply control signals to transistors 124. The decoder may receive static control signals from programmable elements 20 or dynamic control signals from the outputs of programmable logic 18 or hardwired logic on device 10. External control signals may also be routed to the decoder inputs. The decoder contains logic that converts the undecoded control signals on its inputs into corresponding decoded control signals on control lines 150. The use of a decoder increases the complexity of the device 10 somewhat, but reduces the need for programmable elements 20. For example, it is possible to control $2^N$ lines 150 using N programmable elements. In situations in which there are relatively large numbers of transistors 124, it may be more efficient to use a decoder than to use a separate programmable element 20 to control each transistor 124.

Figure 7:
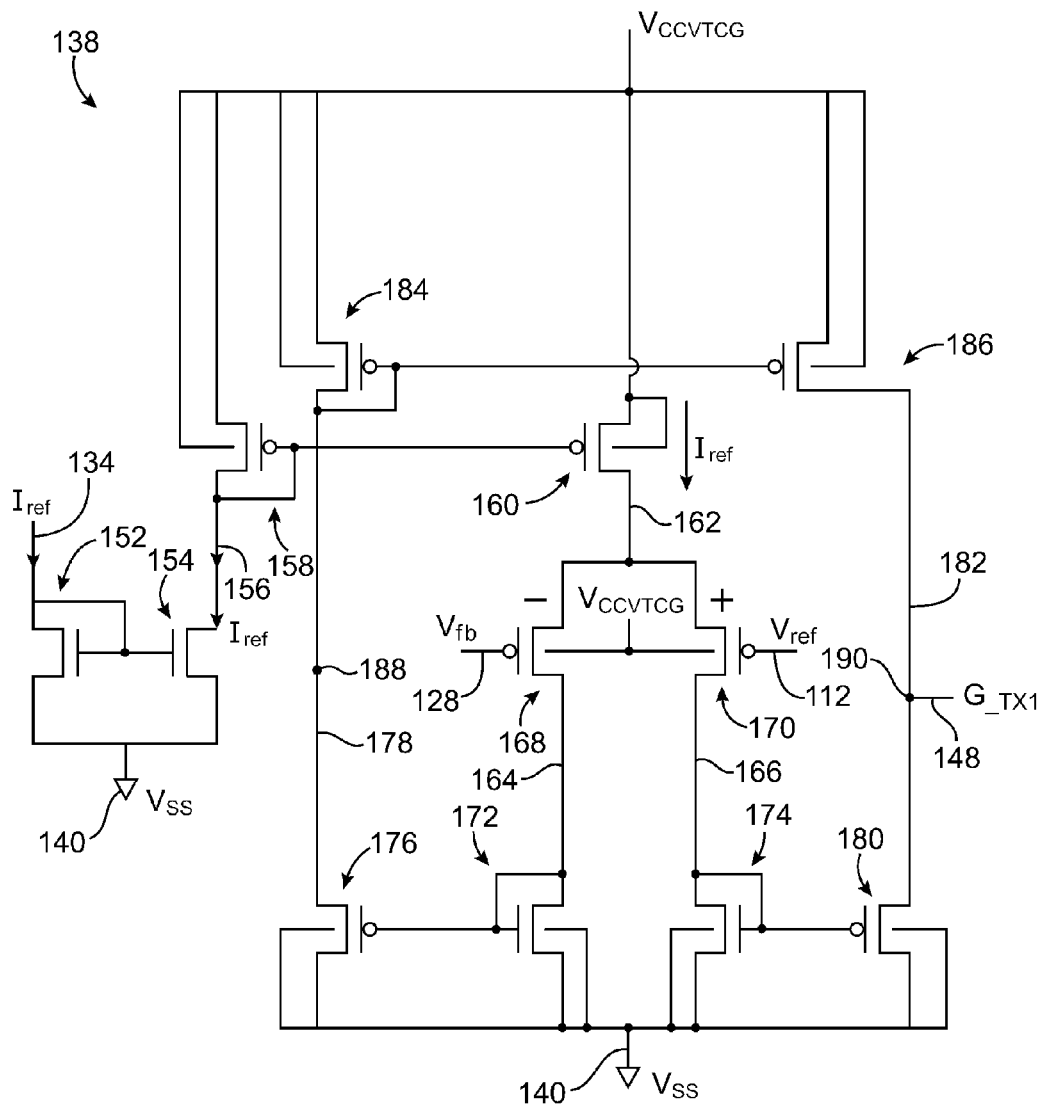
FIG. 7 is a diagram of an illustrative operational amplifier that may be used in a voltage regulator of the type shown in FIG. 6 in accordance with the present invention.

Illustrative circuitry that may be used for operational amplifier 138 is shown in FIG. 7. As shown in FIG. 7, operational amplifier 138 is powered using elevated positive power supply voltage Vccvtcg and ground power supply voltage Vss. The output 148 of operational amplifier 138 produces the signal G_tx1 that is applied to the gate of transistor 116 (FIG. 6).

The reference current Iref from bandgap reference circuit 136 is supplied via line 134. Transistors 152 and 154 form a current mirror, so a current of magnitude Iref flows through path 156. Transistors 158 and 160 also form a current mirror, so current Iref flows through path 162. The current mirrors in FIG. 7 have a mirror ratio of one, because their transistors have equal strength. If desired, current mirrors with other mirror ratios may be used.

Negative input line 128 and positive input line 112 receive voltage Vfb and voltage Vref, respectively. The reference voltage Vref is produced by the bandgap reference circuit 136 (FIG. 6) and is constant. The value of Vfb fluctuates slightly above and below Vref, as Vbias fluctuates slightly around its desired set point value. The value of Vfb relative to the reference value Vref determines whether current is steered through path 164 or path 166.

When Vfb is less than Vref, p-channel metal-oxide-semiconductor transistor 168 is turned on more strongly than p-channel metal-oxide-semiconductor transistor 170. This causes relatively more of the current Iref in path 162 to be steered into path 164 than into path 166. Transistors 172 and 176 form a current mirror, so the additional current steered into path 164 causes additional current to be steered into path 178. Transistors 184 and 186 form a current mirror, so the additional current in path 178 will cause an increased amount of current to flow through transistor 186, causing G_tx1 to go high.

When Vfb is greater than Vref, current is steered into path 166. Transistors 174 and 180 form a current mirror, so the additional current steered into path 166 causes an increased amount of current to flow through transistor 180, causing transistor G_tx1 to go low. In steady state, the value of Vfb settles to Vref and equal amounts of current flow through transistors 186 and 180.

The voltage G_tx1 is allowed to range from about 0.2 volts above the lower power rail set by Vss (e.g., 0.2 volts above 0 volts) to about 0.2 volts below the upper power rail set by Vccvtcg. With one suitable arrangement, the booster circuit 144 is configured to produce a voltage Vccvtcg of about Vccr+0.2 volts+Vt at its output. In this situation, the maximum voltage of G_tx1 will be about Vccr+Vt and the maximum value of Vbias on voltage regulator output line 40 will be about Vccr. This arrangement will therefore provide the voltage regulator 32 with a wide output voltage range, while the use of NMOS transistor 116 ensures that the voltage regulator 32 has a good power supply rejection ratio.

Figure 8:
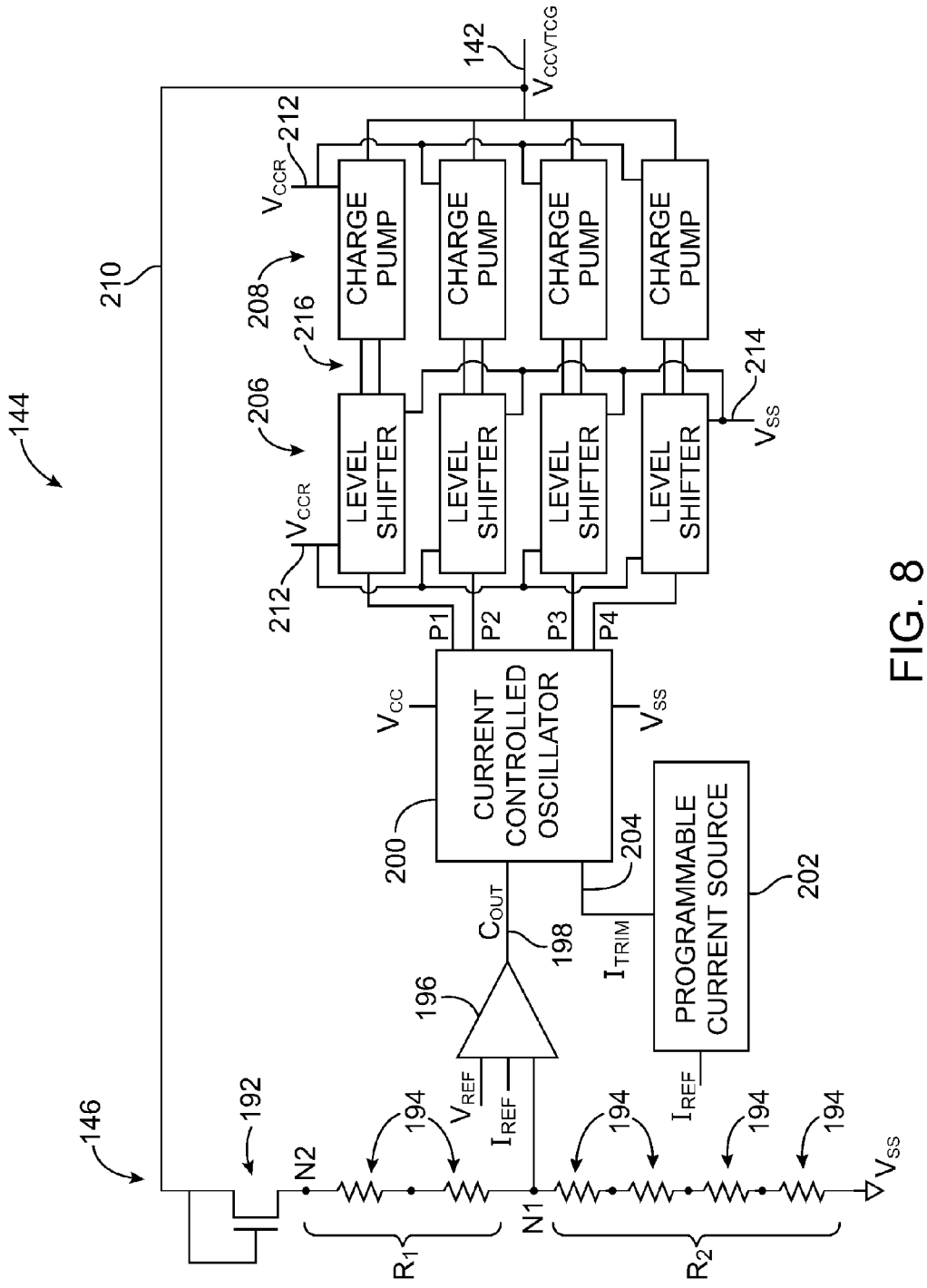
FIG. 8 is a diagram of an illustrative boost circuit that may be used in a voltage regulator of the type shown in FIG. 6 in accordance with the present invention.

Any suitable circuitry may be used for the booster circuit 144 of FIG. 6. An illustrative booster circuit 144 is shown in FIG. 8. Booster circuit 144 of FIG. 8 has a monitor circuit 146. Monitor circuit 146 includes a diode-connected monitor transistor 192 and a voltage divider formed from resistors $R_1$ and $R_2$. The values of $R_1$ and $R_2$ may be selected so that the voltage on node N1 equals voltage Vref (e.g., 0.5 volts) when voltage Vccvtcg on output 142 and feedback path 210 is equal to its nominal desired value (e.g., Vccr+Vt+0.2 volts). If desired, resistors $R_1$ and $R_2$ may be formed from individual resistor segments 194 (e.g., segments that are arranged in a zigzag layout on the integrated circuit 10). Typical values for R1 and R2 are in the tens of kilo-ohms.

During normal operation, comparator 196 compares the voltage on voltage divider node N1 to the reference voltage Vref from the bandgap reference circuit 136 of FIG. 6. If the voltage on node N1 is below Vref, the output of comparator 196 is high and control signal Cout is high. Whenever the voltage on node N1 rises above Vref, comparator 196 takes control signal Cout on output line 198 low.

The control signal Cout is received at the control input of current-controlled oscillator 200. If desired, a programmable current source 202 may be used to supply an adjustable trim current Itrim on line 204 to current-controlled oscillator 200. The adjustable current Itrim may be set to a value that compensates for any process variations that may have arisen during the fabrication of oscillator 200.

Current-controlled oscillator 200 produces a multiphase clock at its output. In the multiphase clock, each clock phase is staggered with respect to the next, so that the downstream circuitry operates more smoothly and makes less abrupt current demands on the power supply. This helps to lower ripple on the output power supply voltage Vccvtcg. In the example of FIG. 8, boost circuit 144 is using a four-phase configuration, so current-controlled oscillator 200 is producing four clock phases labeled P1, P2, P3, and P4, each of which is 450 out of phase with respect to the next. If desired, a greater or smaller number of clock phases may be produced.

The clock signals P1-P4 are provided to respective level shifters 206. Level shifters 206 serve to boost the clock signals from current controlled oscillator 200. With one suitable arrangement, current-controlled oscillator 200 is powered by positive power supply voltage Vcc (e.g., 1.1 volts) and ground power supply voltage Vss (e.g., 0 volts) and level shifting circuitry 206 is powered with positive power supply voltage Vccr (e.g., 2.5 volts at terminal 212) and ground power supply voltage Vss (e.g., 0 volts at terminal 214). With this configuration, the current-controlled oscillator 200 produces clock signals P1-P4 that range from 0 volts to 1.1 volts at its outputs and level shifters 206 produce corresponding level-shifted clock signals on their outputs that range from 0 volts to 2.5 volts.

Each of the level shifters 206 has a pair of corresponding outputs at which true and complement versions of the level-shifted clock signals are provided. For example, the level shifter associated with clock phase P1 (0-Vcc) produces level-shifted clock signals P1' (0-Vccr) and BP1' (Vccr-0) at its outputs. The level shifters associated with clock phases P2, P3, and P4 produce respective pairs of true and complement level-shifted signals at their outputs (e.g., signals P2' and BP2', signals P3' and BP3', and signals P4' and BP4'). The true and complement versions of the level-shifted signals are provided to the inputs of corresponding charge pumps 208 over lines 216.

Figure 9:
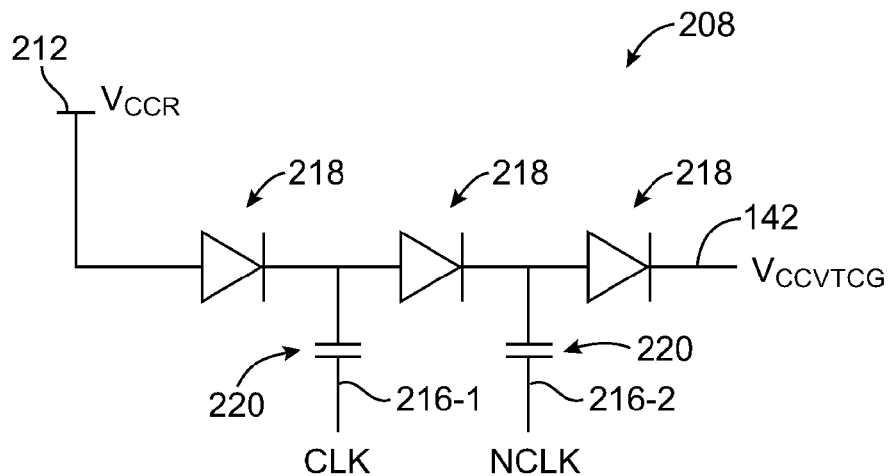
FIG. 9 is a diagram of an illustrative charge pump circuit that may be used in a boost circuit of the type shown in FIG. 8 in accordance with the present invention.
Figure 10:
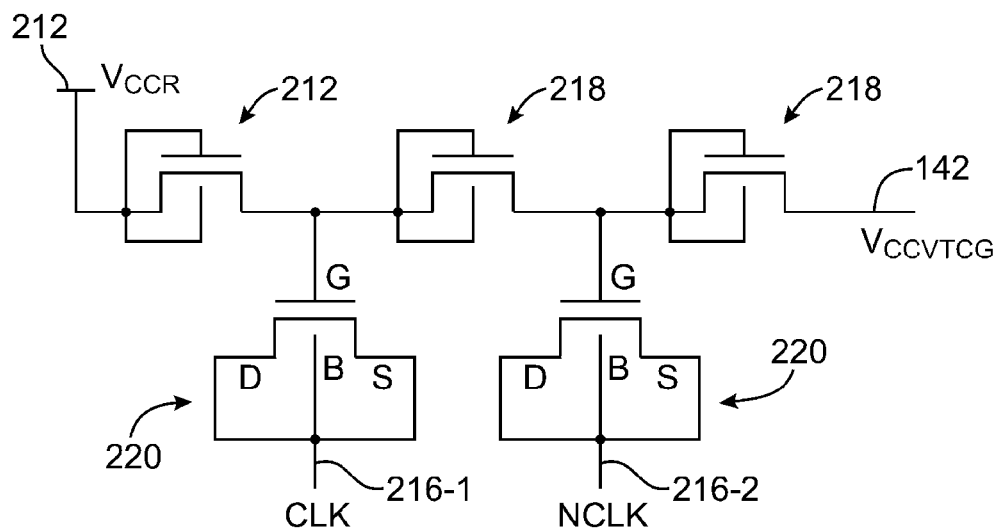
FIG. 10 is a diagram of an illustrative transistor-based implementation of the charge pump circuit of FIG. 9 in accordance with the present invention.

Charge pump circuitry 208 is powered using a voltage such as positive power supply voltage Vccr and produces a correspondingly elevated power supply voltage Vccvtcg at its output 142. Any suitable configuration may be used for charge pumps 208. An illustrative charge pump 208 that is based on a two-stage configuration is shown in FIGS. 9 and 10. This is merely illustrative. Charge pump 208 may have any suitable number of stages.

As shown in FIG. 9, charge pump 208 receives a clock signal CLK and its inverse NCLK at input terminals 216-1 and 216-2. The signals CLK and NCLK correspond to the true and complement versions of the level-shifted clock signals produced by level shifters 206. A first charge pump 208 receives signals P1' and BP1' at its inputs 216-1 and 216-2 from a first level shifter 206, a second charge pump 208 receives signals P2' and BP2' at its inputs 216-1 and 216-2 from a second level shifter 206, etc.

Capacitors 220 and 222 may be formed from metal-oxide-semiconductor transistor structures, as shown in FIG. 10, and are sometimes referred to as MOS capacitors. The capacitor dielectrics in capacitors 220 and 222 are formed from the gate insulators in the MOS transistor structures. One electrode of each capacitor is formed from a transistor gate terminal. The other electrode of each capacitor is formed from the drain, source, and body terminals, which are electrically connected, as shown in FIG. 10. The use of MOS capacitors in charge pumps 208 is advantageous, because MOS capacitors are readily available on device 10 and do not require special processing steps during the semiconductor manufacturing process.

Charge pumps 208 each have three transistors with terminals that are connected to form diodes 218, as shown in FIGS. 9 and 10. Other diode structures may be used to form diodes 218 if desired. In the circuit diagram for the charge pump 208 in FIG. 9, diodes 218 and capacitors 220 are represented using diode and capacitor symbols. In the circuit diagram for the charge pump 208 in FIG. 10, the diodes 218 and capacitors 220 are represented using MOS transistor structures.

When the signals CLK and NCLK are active, the magnitude of the output voltage Vccvtcg at output 142 increases with time through the operation of charge pump circuitry 208. As shown in FIG. 8, the output voltage Vccvtcg is fed back to circuit 146 using feedback path 210. When voltage Vccvtcg rises sufficiently, the voltage on node N1 rises above Vref. When the voltage on node N1 rises above Vref, comparator 196 takes control signal Cout low. This turns off current-controlled oscillator 200. When current-controlled oscillator 200 is off, the clock signals feeding the charge pump circuitry 208 are inactive and the charge pump circuitry 208 stops increasing the output voltage Vccvtcg. This control process is in continuous operation, so the voltage Vccvtcg is well regulated.

The diode-connected transistor 192 is preferably configured so that its geometry is matched to that of transistor 116. For example, if transistor 116 is formed from N gate fingers each of which has a length L and a width W, transistor 192 can be fabricated using a gate length L and a width W. By matching the geometries of transistors 192 and 116 in this way, the behavior of transistor 192 will mimic that of transistor 116 in response to PVT variations. The geometry-matched transistor 192 therefore serves a monitoring function, as described in connection with monitor circuit 146 of FIG. 6. If the threshold voltage of transistor 116 is higher than expected due to PVT variations, the threshold voltage of transistor 192 will rise proportionally. When the threshold voltage of transistor 192 rises, the voltage on node N1 decreases by a corresponding amount. This causes the voltage Vccvtcg on output 142 to settle to a corresponding higher level. Variations in PVT therefore result in corresponding adjustments in voltage Vccvtcg. During operation of voltage regulator 32, these adjustments cancel out undesired threshold voltage changes in transistor 116 due to PVT variations.

The use of a monitor circuit 146 in boost circuit 144 ensures that the voltage Vccvtcg will always be sufficiently large to produce the desired power for operational amplifier 138. Adjusting Vccvtcg automatically in response to the monitor circuit's behavior ensures that the value of G_tx1 will be able to attain a level at the output of operational amplifier 138 that is sufficient to ensure that the voltage Vbias is able to achieve its desired range (e.g., Vbias levels of up to Vccr).

Figure 11:
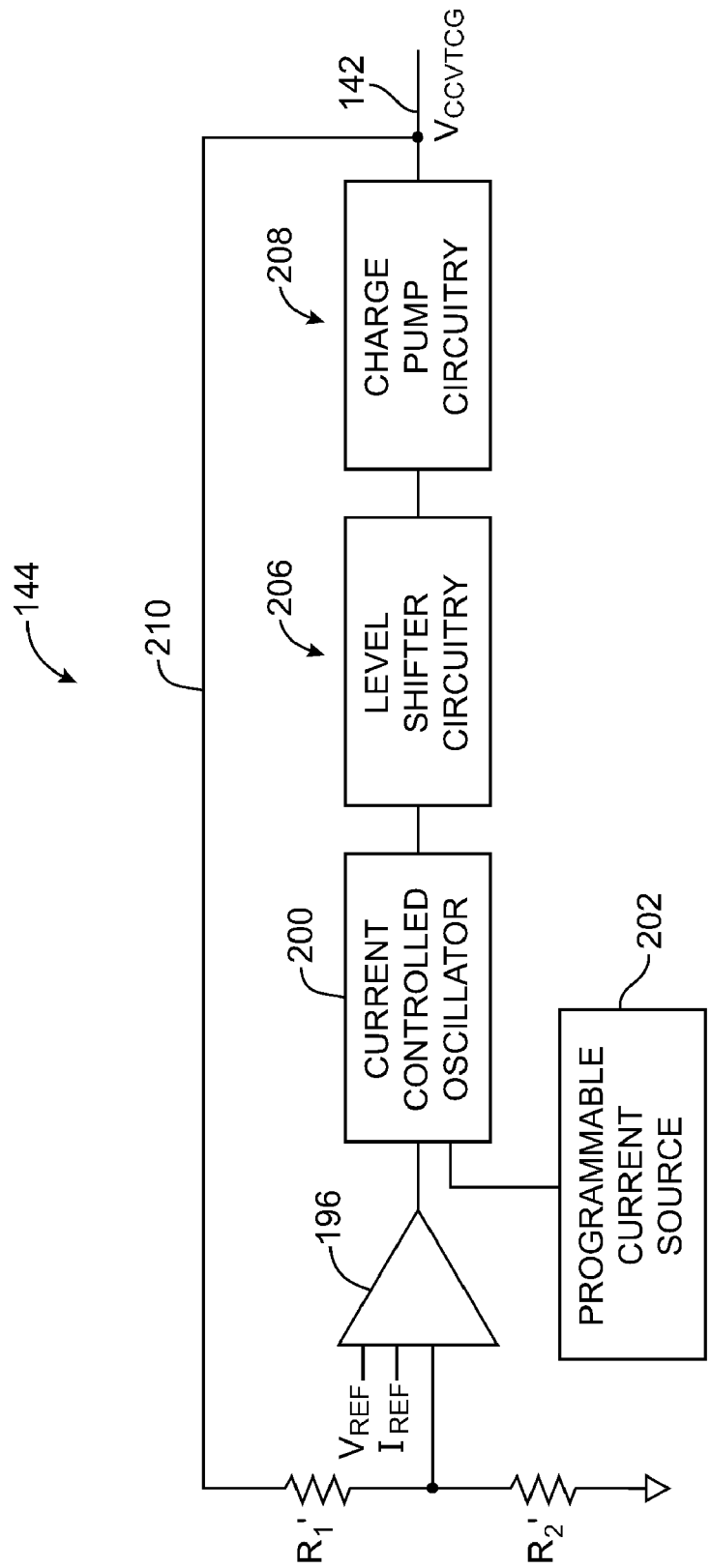
FIG. 11 is a diagram of another illustrative boost circuit that may be used in a voltage regulator of the type shown in FIG. 6 in accordance with the present invention.

If desired, boost circuit 144 can be formed using circuitry that does not contain a monitor circuit 146. This type of boost circuit arrangement is shown in FIG. 11. In the example of FIG. 11, boost circuit 144 has a voltage divider formed from resistors R1' and R2', but does not contain a diode such as diode 192 of FIG. 8. Because PVT variations may lead to undesirable increases in the threshold voltage Vt of transistor 116 that could lead to undesirably low maximum values of Vbias, boost circuit 144 of FIG. 11 is configured to produce a nominally larger voltage than boost circuit 144 of FIG. 9. As an example, boost circuit 144 of FIG. 11 can be configured to produce an output voltage Vccvtcg of 3 volts. By designing boost circuit 144 to provide ample headroom for the Vccvtcg power supply voltage, there is no need to include a monitor circuit 146 in boost circuit 144. Even under conditions in which the threshold voltage of transistor 116 of voltage regulator 32 is larger than its nominal level, the operational amplifier 138 will be able to produce a suitably large output signal G_tx1 at its output to ensure that Vbias reaches its desired level.

The foregoing is merely illustrative of the principles of this invention and various modifications can be made by those skilled in the art without departing from the scope and spirit of the invention.

What is claimed is:

1. A voltage regulator, comprising:
   a boost circuit that produces a second voltage that is elevated with respect to a first voltage;
   an operational amplifier that is powered by the second voltage, that compares a reference voltage to a feedback voltage, and that produces a corresponding control signal;
   an output providing a regulated voltage;
   an n-channel transistor having a drain that receives the first voltage, a gate that receives the control signal, and a source connected to the output;
   a voltage divider connected between the output and a ground terminal; and
   a feedback path coupled to a voltage tap point in the voltage divider that provides the feedback voltage to the operational amplifier.

2. The voltage regulator defined in claim 1 further comprising a plurality of programmable elements loaded with configuration data that produce corresponding output signals, wherein the voltage divider has a plurality of transistors each of which has a gate that receives one of the output signals from a respective one of the plurality of programmable elements.

3. The voltage regulator defined in claim 1 further comprising:
   a bandgap reference circuit that provides at least one reference signal, wherein the voltage divider contains a plurality of programmable elements loaded with configuration data that produce corresponding output signals, a plurality of resistors, and a plurality of transistors, wherein the transistors are connected between respective pairs of the resistors, and wherein the transistors have gates each of which receives a respective output signal from a corresponding one of the programmable elements.

4. The voltage regulator defined in claim 1 wherein the boost circuit comprises charge pump circuitry.

5. The voltage regulator defined in claim 1 wherein the boost circuit comprises a monitor circuit.

6. The voltage regulator defined in claim 1 wherein the boost circuit comprises:
   a voltage divider circuit coupled to the ground terminal, wherein the voltage divider circuit produces a voltage at a node;
   a comparator that receives the voltage from the node and that produces a corresponding oscillator control signal;
   an oscillator that is controlled by the oscillator control signal from the comparator and that produces corresponding clock signals;
   charge pump circuitry that is powered by the first voltage, that receives the clock signals, and that has an output at which the charge pump circuitry produces the second voltage; and
   a feedback path that is coupled between the output of the charge pump circuitry and the voltage divider circuit.

7. The voltage regulator defined in claim 1 wherein the boost circuit comprises:
   a voltage divider circuit coupled to the ground terminal, wherein the voltage divider circuit produces a voltage at a node, wherein the voltage divider circuit contains a diode and two resistors connected in series, and wherein the node is located between the two resistors;
   a comparator that receives the voltage from the node and that produces a corresponding oscillator control signal;
   an oscillator that is controlled by the oscillator control signal from the comparator and that produces corresponding clock signals;
   level shifting circuitry that level shifts the clock signals from the oscillator;
   charge pump circuitry that is powered by the first voltage, that receives the level-shifted clock signals, and that has an output at which the charge pump circuitry produces the second voltage; and
   a feedback path that is coupled between the output of the charge pump circuitry and the voltage divider circuit.

8. The voltage regulator defined in claim 1 wherein the boost circuit comprises:
   a voltage divider circuit coupled to the ground terminal, wherein the voltage divider circuit produces a voltage at a node, wherein the voltage divider circuit contains a diode and two resistors connected in series, and wherein the node is located between the two resistors;
   a comparator that receives the voltage from the node and that produces a corresponding oscillator control signal;
   an oscillator that is controlled by the oscillator control signal from the comparator and that produces corresponding clock signals;
   level shifting circuitry that level shifts the clock signals from the oscillator;
   charge pump circuitry that is powered by the first voltage, that receives the level-shifted clock signals, and that has an output at which the charge pump circuitry produces the second voltage; and
   a feedback path that is coupled between the output of the charge pump circuitry and the voltage divider circuit, wherein the diode is formed from a transistor that is geometry matched to the n-channel metal-oxide-semiconductor transistor.

9. The voltage regulator defined in claim 1 wherein the boost circuit comprises:
   a comparator that receives a voltage divider voltage from a node and a reference voltage and that produces a corresponding oscillator control signal;
   an oscillator that is controlled by the oscillator control signal from the comparator and that produces corresponding clock signals;
   charge pump circuitry that is powered by the first voltage, that receives the clock signals, and that has an output at which the charge pump circuitry produces the second voltage;
   a feedback path that is connected to the output of the charge pump circuitry; and
   two resistors that are connected to each other at a node and that are connected in series between the feedback path and the ground terminal.

10. The voltage regulator defined in claim 1 wherein the voltage divider comprises a chain of series-connected resistors, wherein the n-channel transistor has a threshold voltage, and wherein the regulated voltage is within less than the threshold voltage of the first voltage.

11. A programmable logic device integrated circuit comprising:
    a first pin that receives a first power supply voltage;
    a boost circuit that produces a second power supply voltage from the first power supply voltage, wherein the second power supply voltage is elevated with respect to the first power supply voltage;
    an operational amplifier that is powered by the second power supply voltage, that compares a reference voltage to a feedback voltage, and that produces a corresponding control signal;
    an n-channel metal-oxide-semiconductor transistor having a drain that receives the first supply voltage, a gate that receives the control signal, and a source;
    an output connected to the source at which a regulated output voltage is provided;
    a voltage divider connected between the output and a ground terminal; and
    a feedback path coupled between a voltage tap point in the voltage divider and the operational amplifier, wherein the feedback path provides the feedback voltage to the operational amplifier.

12. The programmable logic device integrated circuit defined in claim 11 further comprising:
    programmable logic containing metal-oxide-semiconductor transistors having body terminals to which a body bias voltage is applied; and
    body bias circuitry to which the regulated output voltage is provided and which uses the regulated output voltage in biasing the body terminals.

13. The programmable logic device integrated circuit defined in claim 11 further comprising:
    a configuration random-access-memory array to which the regulated output voltage is provided.

14. The programmable logic device integrated circuit defined in claim 11 further comprising:
- programmable logic containing metal-oxide-semiconductor transistors having body terminals to which a body bias voltage is applied;
- body bias circuitry to which the regulated output voltage is provided and which uses the regulated output voltage in biasing the body terminals; and
- a configuration random-access-memory array to which the regulated output voltage is provided.

15. The programmable logic device integrated circuit defined in claim 11 further comprising a bandgap reference circuit that produces the reference voltage, wherein the boost circuit comprises:
- a voltage divider circuit coupled to the ground terminal, wherein the voltage divider circuit produces a voltage at a node;
- a comparator that receives the voltage from the node and the reference voltage and that produces a corresponding oscillator control signal;
- an oscillator that is controlled by the oscillator control signal from the comparator and that produces corresponding clock signals;
- charge pump circuitry that is powered by the first power supply voltage, that receives the clock signals, and that has an output at which the charge pump circuitry produces the second power supply voltage; and
- a feedback path that is coupled between the output of the charge pump circuitry and the voltage divider circuit.

16. The programmable logic device integrated circuit defined in claim 11 further comprising:
- core logic that is powered using a core logic power supply voltage supplied at a core power supply voltage pin;
- input-output circuitry that is powered using an input-output power supply voltage supplied at an input-output power supply voltage pin; and
- predriver circuitry that is powered using a predriver power supply voltage that is supplied at a predriver power supply voltage pin.

17. The programmable logic device integrated circuit defined in claim 11 further comprising:
- core logic that is powered using a core logic power supply voltage supplied at a core power supply voltage pin;
- input-output circuitry that is powered using an input-output power supply voltage supplied at an input-output power supply voltage pin;
- predriver circuitry that is powered using a predriver power supply voltage that is supplied at a predriver power supply voltage pin; and
- a bandgap reference circuit that produces the reference voltage, wherein the boost circuit comprises:
  - a voltage divider circuit coupled to the ground terminal, wherein the voltage divider circuit produces a voltage at a node;
  - a comparator that receives the voltage from the node and the reference voltage and that produces a corresponding oscillator control signal;
  - an oscillator that is powered by the core logic power supply voltage, that is controlled by the oscillator control signal from the comparator, and that produces corresponding clock signals;
  - charge pump circuitry that is powered by the first power supply voltage, that receives the clock signals, and that has an output at which the charge pump circuitry produces the second power supply voltage; and
  - a feedback path that is coupled between the output of the charge pump circuitry and the voltage divider circuit.

18. The programmable logic device integrated circuit defined in claim 11 further comprising:
- core logic that is powered using a core logic power supply voltage supplied at a core power supply voltage pin;
- input-output circuitry that is powered using an input-output power supply voltage supplied at an input-output power supply voltage pin; and
- a bandgap reference circuit that produces the reference voltage, wherein the boost circuit comprises:
  - a voltage divider circuit coupled to the ground terminal, wherein the voltage divider circuit produces a voltage at a node;
  - a comparator that receives the voltage from the node and that produces a corresponding oscillator control signal;
  - an oscillator that is controlled by the oscillator control signal from the comparator and that produces corresponding clock signals;
  - level shifting circuitry that level shifts the clock signals from the oscillator;
  - charge pump circuitry that is powered by the first power supply voltage, that receives the level-shifted clock signals, and that has an output at which the charge pump circuitry produces the second power supply voltage; and
  - a feedback path that is coupled between the output of the charge pump circuitry and the voltage divider circuit, wherein the voltage divider circuit includes a diode that is formed from a transistor that is geometry-matched to the n-channel metal-oxide-semiconductor transistor.

19. The programmable logic device defined in claim 11 wherein the boost circuit comprises:
- a feedback path;
- two resistors that are connected at a node and that are connected in series between the feedback path of the boost circuit and the ground terminal;
- a comparator that receives a signal from the node;
- a current-controlled oscillator that receives a trim current and that receives a control signal from the comparator;
- level shifting circuitry that receives clock signals from the oscillator; and
- charge pump circuitry that receives level-shifted clock signals from the level shifting circuitry, wherein the charge pump circuitry has an output that is connected to the boost circuit feedback path at which the charge pump circuitry produces the second power supply voltage.

20. The programmable logic device defined in claim 11 wherein the boost circuit comprises:
- a boost circuit feedback path;
- two resistors that are connected at a node and that are connected in series between the boost circuit feedback path and the ground terminal;
- a comparator that receives a signal from the node;
- a current-controlled oscillator that receives a control signal from the comparator and that produces corresponding multiphase clock signals;
- level shifting circuitry that receives multiphase clock signals from the oscillator; and
- charge pump circuitry that receives true and complement level-shifted versions of the multiphase clock signals from the level shifting circuitry, wherein the charge pump circuitry has an output that is connected to the boost circuit feedback path at which the charge pump circuitry produces the second power supply voltage.

* * * * *

UNITED STATES PATENT AND TRADEMARK OFFICE
CERTIFICATE OF CORRECTION

PATENT NO.        : 7,639,067 B1
APPLICATION NO.   : 11/636907
DATED             : December 29, 2009
INVENTOR(S)       : Srinivas Perisetty Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this

Ninth Day of November, 2010

David J. Kappos
*Director of the United States Patent and Trademark Office*